United States Patent
Jordan et al.

(10) Patent No.: US 9,195,328 B2
(45) Date of Patent: Nov. 24, 2015

(54) METHOD FOR PROVIDING AN INDIVIDUAL INCREASED ACCESSIBILITY TO A TOUCH SCREEN

(71) Applicant: Wisconsin Alumni Research Foundation, Madison, WI (US)

(72) Inventors: J. Bern Jordan, Madison, WI (US); Gregg C. Vanderheiden, Madison, WI (US); David P. Kelso, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/272,885

(22) Filed: May 8, 2014

(65) Prior Publication Data

US 2014/0240270 A1 Aug. 28, 2014

Related U.S. Application Data

(62) Division of application No. 13/222,595, filed on Aug. 31, 2011, now Pat. No. 8,760,421.

(51) Int. Cl.
*G06F 3/041* (2006.01)
*G06F 3/0488* (2013.01)
*G06F 3/0482* (2013.01)

(52) U.S. Cl.
CPC .............. *G06F 3/041* (2013.01); *G06F 3/0482* (2013.01); *G06F 3/0488* (2013.01)

(58) Field of Classification Search
CPC .......................... G06F 3/03547; G06F 3/04883
USPC .......................................... 345/173; 715/702
See application file for complete search history.

(56) References Cited

U.S. PATENT DOCUMENTS

| | | | |
|---|---|---|---|
| D310,820 S | 9/1990 | Watson et al. | |
| 4,989,610 A | 2/1991 | Patton et al. | |
| 5,155,806 A | 10/1992 | Hoeber et al. | |
| D348,065 S | 6/1994 | Madill et al. | |
| D370,663 S | 6/1996 | Swain et al. | |
| 6,049,328 A * | 4/2000 | Vanderheiden | 345/173 |
| D436,579 S | 1/2001 | Mayo et al. | |
| D451,482 S | 12/2001 | Vanderheiden et al. | |
| 6,415,164 B1 | 7/2002 | Blanchard et al. | |
| 6,624,803 B1 | 9/2003 | Vanderheiden et al. | |
| 6,999,066 B2 | 2/2006 | Litwiller | |
| D535,627 S | 1/2007 | Merritt et al. | |
| D543,159 S | 5/2007 | Merritt et al. | |
| 2003/0040340 A1 | 2/2003 | Smethers | |
| 2003/0046451 A1 | 3/2003 | Prabhakaran | |
| 2004/0119685 A1 | 6/2004 | Harries et al. | |
| 2006/0022955 A1 | 2/2006 | Kennedy | |
| 2006/0026536 A1 | 2/2006 | Hotelling et al. | |

(Continued)

*Primary Examiner* — Kevin Nguyen
(74) *Attorney, Agent, or Firm* — Boyle Fredrickson, S.C.

(57) ABSTRACT

A method is defined for providing an individual increased accessibility to a touch screen displaying first and second elements. The individual initially engages the touch screen with a contact point at a first location. The contact point is dragged across the touch screen into engagement with the first element and the first element is highlighted in response thereto. Thereafter, the individual may drag the contact point across the touch screen from the first element into engagement with the second element whereby the second element is highlighted on the touch screen and the highlight is removed from the first element. Audible announcements may accompany the contacting of the first or second elements with the contact point.

14 Claims, 7 Drawing Sheets

(56) References Cited

U.S. PATENT DOCUMENTS

| | | |
|---|---|---|
| 2008/0204426 A1 | 8/2008 | Hotelling et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0231610 A1 | 9/2008 | Hotelling et al. |
| 2009/0187842 A1 | 7/2009 | Collins et al. |
| 2010/0073329 A1 | 3/2010 | Raman et al. |
| 2011/0302519 A1* | 12/2011 | Fleizach et al. ............... 715/773 |
| 2012/0096400 A1 | 4/2012 | Cho |

* cited by examiner

METHOD FOR PROVIDING AN INDIVIDUAL INCREASED ACCESSIBILITY TO A TOUCH SCREEN

REFERENCE TO GOVERNMENT GRANT

This invention was made with government support under H133E080022 awarded by the US Department of Education. The government has certain rights in the invention.

CROSS-REFERENCE TO RELATED APPLICATION

This application is divisional of U.S. Ser. No. 13/222,595, filed Aug. 31, 2011.

FIELD OF THE INVENTION

The invention relates generally to human-machine interfaces (HMIs), and in particular, to a device for providing improved access to the functions of HMIs for people with disabilities.

BACKGROUND AND SUMMARY OF THE INVENTION

The electronic touch screen is representative of current innovative HMIs for electronic devices. With a touch screen, a user enters data by touching virtual buttons displayed on the computer display. With a touch screen system, the type, size, and number of the virtual buttons may be readily changed by changing the computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen along with the virtual buttons can help to further guide the user through the steps of data input.

Normally, a touch screen system uses a touch screen panel which is placed directly over the viewing area of a standard computer display, for example, a cathode ray tube ("CRT") or a liquid crystal display ("LCD"). The touch screen panel provides a signal to a computer associated with the computer display indicating where on the surface of the display a stylus or finger is placed. This signal may be generated, for example, by acoustic systems detecting absorption of sound by a finger on the surface of the display; by systems using crossed beams of infrared light arrayed along x and y axes which are broken by the finger; or by laminated transparent electrodes which are physically compressed against each other to provide a point electrical contact that may be/interpreted as an x and y coordinate.

Frequently, a touch screen will be used with a computer contained within a device to be used by the public. The computer may have so-called multi-media capabilities providing both a visual and audio program intended to help members of the public obtain information or directions. Despite the advantage of touch screen systems in such applications, like many novel interface controls, they present a barrier to many people with disabilities. Those with impaired vision perceive only the featureless surface of the display screen knowing that it may contain one or more virtual buttons of arbitrary placement and functions. Those unfamiliar with the language of the legends on the buttons or those who cannot read, are also foreclosed from much of the information presented by touch screen systems.

Therefore, it is a primary object and feature of the present invention to provide a method for improving access to the functions of HMIs for people with disabilities, such as those with impaired vision; those unfamiliar with the language utilized by HMIs; and/or those who cannot read.

It is a further object and feature of the present invention to provide a method for improving access to the functions of HMIs for people with disabilities that is simple and inexpensive to implement.

It is a still further object and feature of the present invention to provide a method for improving access to the functions of HMIs for people with disabilities that may be utilized without altering operation of the HMIs or the electronic devices controlled by the HMIs.

In accordance with the present invention, a method is defined for providing an individual increased accessibility to a touch screen displaying an element, e.g. a virtual button. The method includes the steps of engaging the touch screen with a contact point of the individual. The contact point is dragged across the touch screen into engagement with the element. An audible announcement is generated that corresponds to the element in response to engagement of the contact point with the element.

It is contemplated to highlight the element on the touch screen in response to engagement of the element with the contact point. The highlighting of the element may be maintained in response to disengagement of the contact point from the touch screen. The element may be tapped with the contact point so as to activate the element. In addition, an input device having a key may be provided such that the element may be activated by actuating the key.

The element may be a first element and the touch screen may display a second element. The contact point may be dragged across the touch screen from the first element into engagement with the second element. A second audible announcement may be generated corresponding to the second element in response to engagement of the second element with the contact point. The first element may be highlighted on the touch screen in response to engagement of the first element with the contact point and the second element may be highlighted on the touch screen in response to engagement of the second element with the contact point. It is contemplated to remove the highlight from the first element in response to disengagement of the contact point with the first element or in response to engagement of the contact point with the second element.

In accordance with a further aspect of the present invention, a method is defined for providing an individual increased accessibility to a touch screen displaying at least one element. The method includes the step of engaging the touch screen with a contact point of the individual. The contact point is dragged across the touch screen into engagement with a first element. The first element is highlighted in response to engagement of the contact point with the first element. The highlighting of the first element is maintained on the touch screen in response to disengagement of the contact point from the touch screen.

It is contemplated to generate an audible announcement corresponding to the first element in response to engagement of the contact point with the first element. The first element may be a virtual button. The tapping of the virtual button with the contact point activates the element. In addition, the element may be activated by actuating a key of an input device.

The contact point may be dragged across the touch screen from the first element into engagement with a second element. The second element is highlighted on the touch screen in response to engagement of the second element with the contact point. Thereafter, the highlight is removed from the first element in response to disengagement of the contact point with the first element or in response to engagement of the contact point with the second element. A second audible announcement corresponding to the second element may be generated in response to engagement of the contact point with the second element.

In accordance with a still further aspect of the present invention, a method is defined for providing an individual increased accessibility to a touch screen displaying first and second elements. The individual initially engages the touch screen with a contact point at a first location. The contact point is dragged across the touch screen into engagement with the first element and the first element is highlighted in response thereto. Thereafter, the individual may drag the contact point across the touch screen from the first element into engagement with the second element whereby the second element is highlighted on the touch screen and the highlight is removed from the first element.

The first location may be the second element and at least one of the first and second elements may be a virtual button. A first audible announcement corresponding to the first element may be generated in response to engagement of the contact point with the first element and a second audible announcement corresponding to the second element may be generated in response to engagement of the contact point with the second element. The highlighting of the first element on the touch screen may be maintained in response to disengagement of the contact point from the touch screen prior to engagement of the second element with the contact point.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
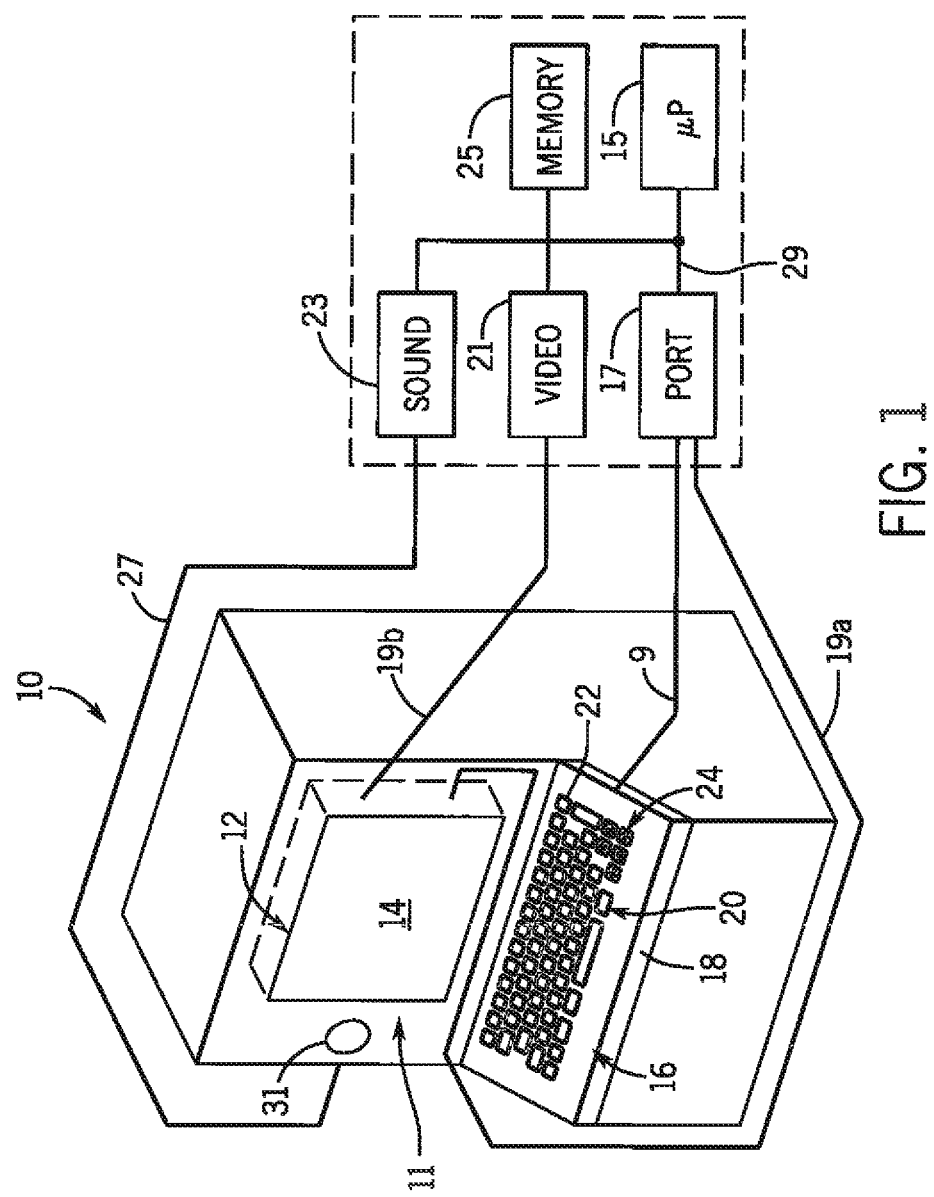
FIG. 1 is a schematic view of a kiosk incorporating a keyboard system in accordance with the present invention.

Referring now to FIG. 1, a schematic of a kiosk is generally designated by a reference numeral 10. Kiosk 10 includes a conventional touch screen system 11 incorporating touch screen 12 positioned in front of and in alignment with a standard computer display, for example, a cathode ray tube or a liquid crystal display. Touch screen 12 is well known in the art and may apply a number of different technologies, including those employing crossed beams of infrared light (which detect a finger or stylus by the interruption of one or more beams), and those employing layered transparent electrodes (which detect the finger or stylus by its deforming layers and causing the electrodes to touch). As is conventional, touch screen 12 includes an outer, display surface 14 on which the stylus or finger is placed, for reasons hereinafter described.

As is conventional, touch screen 12 and the computer display are operatively connected to port 17 and video board 21 via lines 19a and 19b, respectively. Port 17 is, in turn, operatively connected to central processing unit 15 via bus 29. Touch screen 12 provides a user interface with central processing unit 15 that is flexibly tailored to a particular application operating in accordance with a computer software program stored on memory 25. Memory 25 also holds other data and software programs including the software program that will be described below forming part of the present invention. The program may be implemented in a number ways depending on the particular device and so a functional description of the program will be provided such as would allow it to be readily incorporated into standard electronic devices by one of ordinary skill in the art. Video board 21 is also connected to and receives data generated by execution of the software program by central processing unit 15 over bus 29 in order to provide video data to touch screen 12.

Touch screen 12 provides a high-resolution X-Y coordinate signal to central processing unit 15 in response to the touching or "pressing" of the display surface of the touch screen. Typically in operation, one of a plurality of screens is displayed by central processing unit 15 in response to the computer program stored in memory 25 and/or inputs from the user, as heretofore described. It is intended for kiosk 10 to be accessible to following individuals: (1) blind individuals; (2) individuals who have difficulty seeing or reading the kiosk, either because user's vision blurs the image or because the user cannot interpret the written legends on the screen (this may be result of problems understanding written language or an unfamiliarity with the particular written language or graphic element on the kiosk); (3) individuals who have difficulty hearing; and (4) individuals who have difficulty reaching or touching the kiosk screen, for example, individuals with restricted mobility including those using wheelchairs. Further, kiosk 10 may be used use by individuals with combinations of above described disabilities including those who cannot hear or who cannot see the kiosk.

In order for kiosk 10 to meet the dual requirements of maintaining the advantageous characteristics of the touch screen system 11 in presenting data quickly to users who are not disabled and providing access to the same information by users with disabilities with a minimum of additional effort, sound card 23 and keyboard 16 are provided. Sound card 23 is operatively connected to kiosk 10 by line 27 and to central processing unit 15. Sound card 23 receives data from the bus 29 by virtue of execution of the computer program by central processing unit 15 to produce sound communicated to an earphone jack or speaker 31 provided at the front of kiosk 10.

As is conventional, keyboard 16 includes housing 18 having a circuit board received therein. A plurality of standard hard contact keys 20 project from corresponding openings 22 in housing 18. Each key 20 of keyboard 16 corresponds to a standard alpha-numeric character on a conventional keyboard. Small conductive plates are provided on the inner ends of keys 20. When a key 20 of keyboard 16 is depressed, the corresponding conductive plate on the inner end of the key engages the circuit board, thereby closing a circuit on the circuit board. In response, a corresponding signal associated with the depressed key 20 of keyboard 16 is sent to central processing unit 15 via port 17 along line 19. Biasing structures are provided to urge keys 20 toward their non-depressed position.

Figure 2:
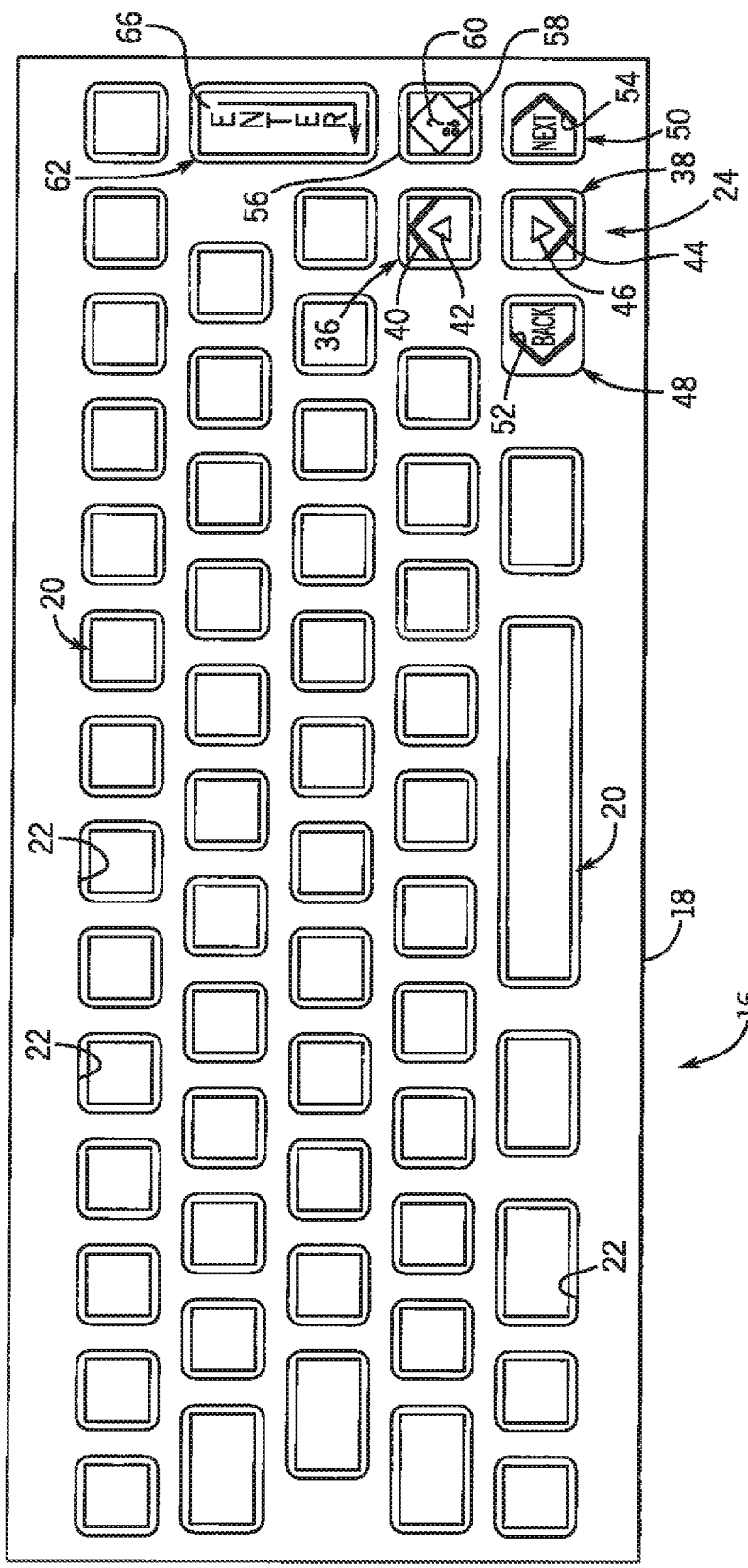
FIG. 2 is a top plan view of the keyboard system of the present invention.

Referring to FIG. 2, keyboard 16 further includes a plurality of access keys, hereinafter referred to collectively by the reference number 24. It can be appreciated that the orientation and locations of access keys 24 on keyboard 16, as hereinafter described, may be varied without deviating from the scope of the present invention. Access keys 24 include up key 36 and down key 38 having generally square configurations and being axially aligned with each other. It can be appreciated that the orientation and locations of the up key 36 and down key 38 may be varied, although ideally consistency should be maintained for the benefit of the individuals who need to use this system in a variety of different contexts. Up key 36 includes an upwardly directed chevron 40 projecting from the upper surface thereof. Triangular shaped indicia 42 is provided on upper surface of up key 36 at a location below and directed towards chevron 40. Down key 38 includes a downwardly directed chevron 44 projecting from the upper surface thereof. Triangular shaped indicia 46 is provided on upper surface of down key 38 at a location above and directed towards chevron 44. It is intended for chevrons 40 and 44 to present, by touch and sight, the shape of arrows pointing upward and downward along a generally vertical axis to identify up key 36 and down key 38 to a user. As is conventional, up and down keys 36 and 38, respectively, are movable between a non-depressed condition and a depressed condition.

Access keys 24 further includes back key 48 and next key 50 having generally square configurations and being axially aligned with each other. It is contemplated for back key 48 and next key 50 to be positioned on opposites sides of down key 38. It can be appreciated that the orientation and locations of the back key 48 and down key 50 may be varied, although ideally consistency should be maintained for the benefit of the individuals who need to use this system in a variety of different contexts. Back key 48 includes a leftwardly directed chevron 52 projecting from the upper surface thereof. The term "BACK" is provided on upper surface of back key 48 at a location to the right of chevron 52. Next key 50 includes a rightwardly directed chevron 54 projecting from the upper surface thereof. The term "NEXT" is provided on upper surface of next key 38 at a location to the left of chevron 54. It is intended for chevrons 52 and 54 to present, by touch and sight, the shape of arrows pointing leftward and rightward along a generally horizontal axis to identify back key 48 and next key 50 to a user. As is conventional, back and next keys 48 and 50, respectively, are movable between a non-depressed condition and a depressed condition.

Access keys 24 further includes a help key 56 having a generally square configuration and being positioned to the right of up key 36 and above next key 50. Diamond-shaped tactile indicator 58 (i.e., a square with one diagonal oriented vertically) projects from the upper surface of help key 56. Indicia 60 may be provided on the upper surface of diamond-shaped tactile indicator 58 to identify help key 56 to a potential user. As is conventional, help key 56 is movable between a non-depressed condition and a depressed condition. When help key 56 of keyboard 16 is depressed, the corresponding conductive plate on the inner end of help key 56 engages the circuit board, thereby closing a circuit on the circuit board and generating in a corresponding signal associated with the depressed help key 56 of keyboard 16 that is sent to central processing unit 15 via port 17 along line 9. Central processing unit 15 controls operation of help key 56 in accordance with the software program stored on memory 25. By way of example, central processing unit 15 may provide context sensitive help in the form of an audio reading of text displayed on touch screen 12 or a textual display on touch screen 12 in response to actuation of help key 56.

Finally, access keys 24 include action key 62 having a generally rectangular configuration and being positioned above help key 56. Indicator 66 (i.e., an L-shaped indicia) is provided on the upper surface of action key 62. The term "ENTER" may be provided on the upper surface of action key 62 adjacent indicator 66 in order to identify action key 62 to a potential user. As is conventional, action key 62 is movable between a non-depressed condition and a depressed condition. When action key 62 of keyboard 16 is depressed, the corresponding conductive plate on the inner end of action key 62 engages the circuit board, thereby closing a circuit on the circuit board and generating a corresponding signal associated with the depressed help key 56 of keyboard that is sent to central processing unit 15 via port 17 along line 9. Central processing unit 15 controls operation of action key 62 in accordance with the software program stored on memory 25. More specifically, it is contemplated for action key 62 to function as a standard "enter" key on a conventional keyboard. In addition, it is contemplated for action key 62 to be used by user to activate, mark, and/or activate elements displayed on touch screen 12 and to reread text and cause text to be spelled over speaker 31.

Figure 3:
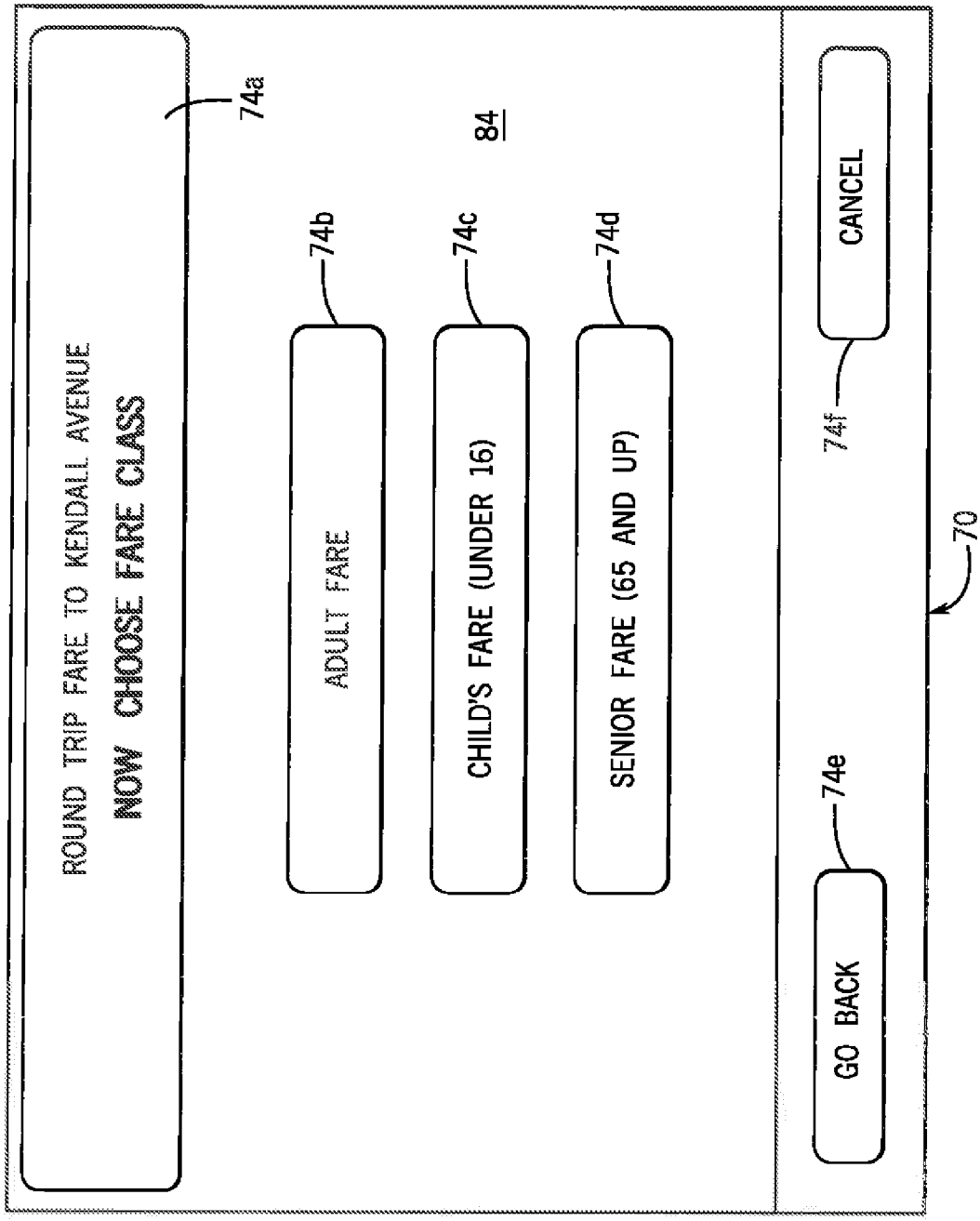
FIG. 3 is a front plan view of an exemplary screen for display on the kiosk of FIG. 1 in an initial condition.

It is intended for kiosk 10 to present data quickly to users who are not disabled, but to also provide access to the same information to users with disabilities with a minimum of additional effort. Referring to FIG. 3, in operation, an exemplary access screen 70 to be displayed on touch screen 12 by central processing unit 15 in response to the internal stored program stored on memory 25, is depicted. Kiosk 10 provides a user with the ability to utilize multiple paths and methods of communication. By way of example, a user may utilize touch screen 12 or keys 20 of keyboard 16 to control operation of kiosk 10. Alternatively, it is contemplated for a disabled user to use access keys 24 in combination with touch screen 12 and/or keys 20 of keyboard 16, as hereinafter described, to control kiosk 10.

Referring to FIG. 3, in operation, is contemplated for access screen 70 to display a series of elements 74a-74f in accordance with the internal stored program stored on memory 25. By way of example, an element (e.g., element 74a) may take the form of a non-input element containing information, e.g., alpha-numeric data; or an element (e.g., elements 74b-74f) may take the form of a virtual button for activating an option provided on access screen 70, for navigating through a series of access screens; or for a similar type of activity. It can be appreciated that elements 74a-74f may take alternate forms such as text, graphics, checkboxes, text/numeric entry fields or the like, without deviating from the scope of the present invention.

Figure 4:
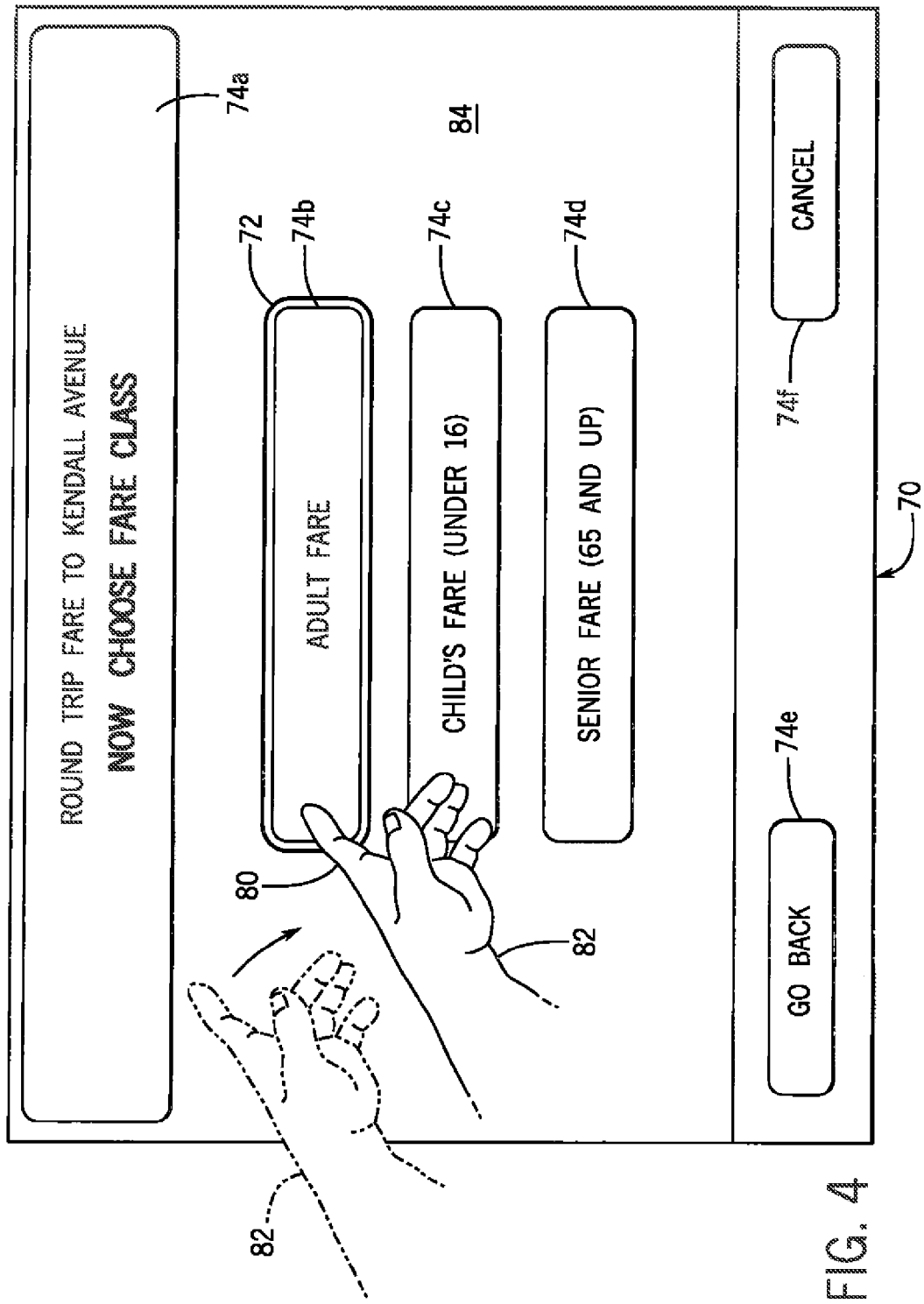
FIG. 4 is a front plan view of the exemplary screen of FIG. 3 in operation.

In order to enter a slide-to-read mode, user 82 touches access screen 70 with finger 80 and drags finger 80 across access screen 70 into contact with an element, e.g., element 74b. By way of example, user 82 may touch access screen 70 with finger 80 at a location 84 either inside or outside of elements 74a-74f, FIG. 4, and drag finger 80 across access screen 70 into contact with an element, e.g., element 74b. As a result, navigation highlight 72 will be provided about element 74b and central processing unit 15 causes an audio reading of the information provided in activation element 74b over speaker 31. In addition, it is contemplated for central processing unit 15 to modify the visual appearance of the information provided in activation element 74b, (e.g., enlarge the text to facilitate the reading thereof) in response to engagement of element 74b with finger 80. User 82 may actuate the highlighted element, e.g., element 74b, by depressing action key 62 with finger 80 or by tapping the highlighted element, e.g., element 74b. It is noted, however, that the simple removal of finger 80 from engagement with the highlighted element, e.g., element 74b, will not actuate the highlighted element. Further, it is noted that independent of the location of navigation highlight 72, in the slide-to-read mode, a user 82 may selectively actuate any actionable element, e.g., elements 74b-74f, by tapping the such element with finger 80. Alternatively, user 82 may thereafter touch access screen 70 with finger 80 on element 74b and drag finger 80 across access screen 70 into contact with a different element, namely, elements 74a or 74c-74f. Once again, navigation highlight 72 will be provided about the engaged element, e.g., one of elements 74a or 74c-74f, and central processing unit 15 will cause an audio reading of the information provided in the highlighted element over speaker 31. It is contemplated to remove the navigation highlight 72 from previously highlighted element 74b in response to disengagement of finger 80 with the element 74b or in response to engagement of finger 80 with the subsequently contacted element, namely, elements 74a or 74c-74f. Again, it is contemplated for central processing unit 15 to modify the visual appearance of the information provided in highlighted element, (e.g., enlarge the text to facilitate the reading thereof) in response to engagement of highlighted element with finger 80.

Figure 5:
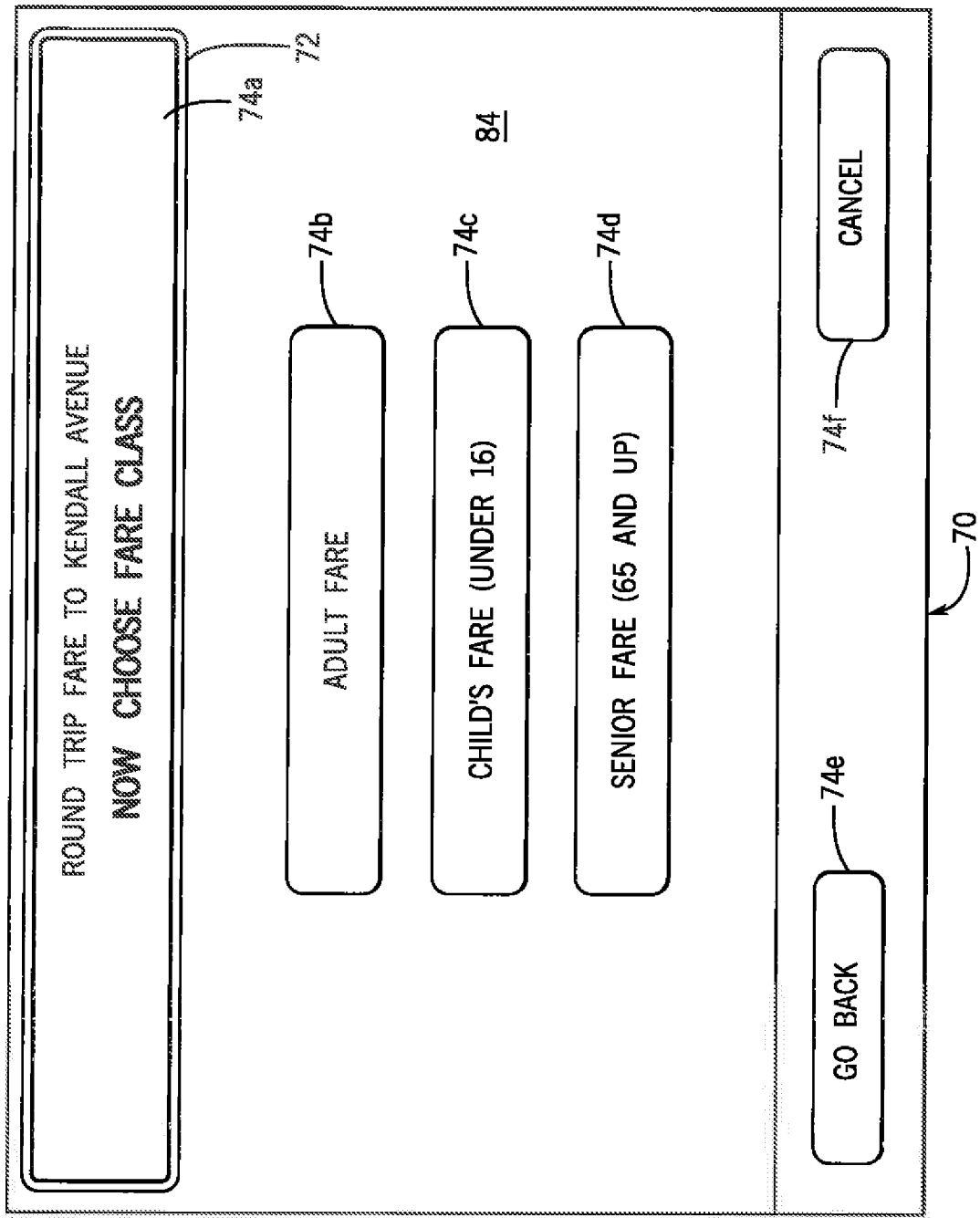
FIG. 5 is a is a front plan view of an exemplary screen for display on the kiosk of FIG. 1 in an alternate initial condition.
Figure 6:
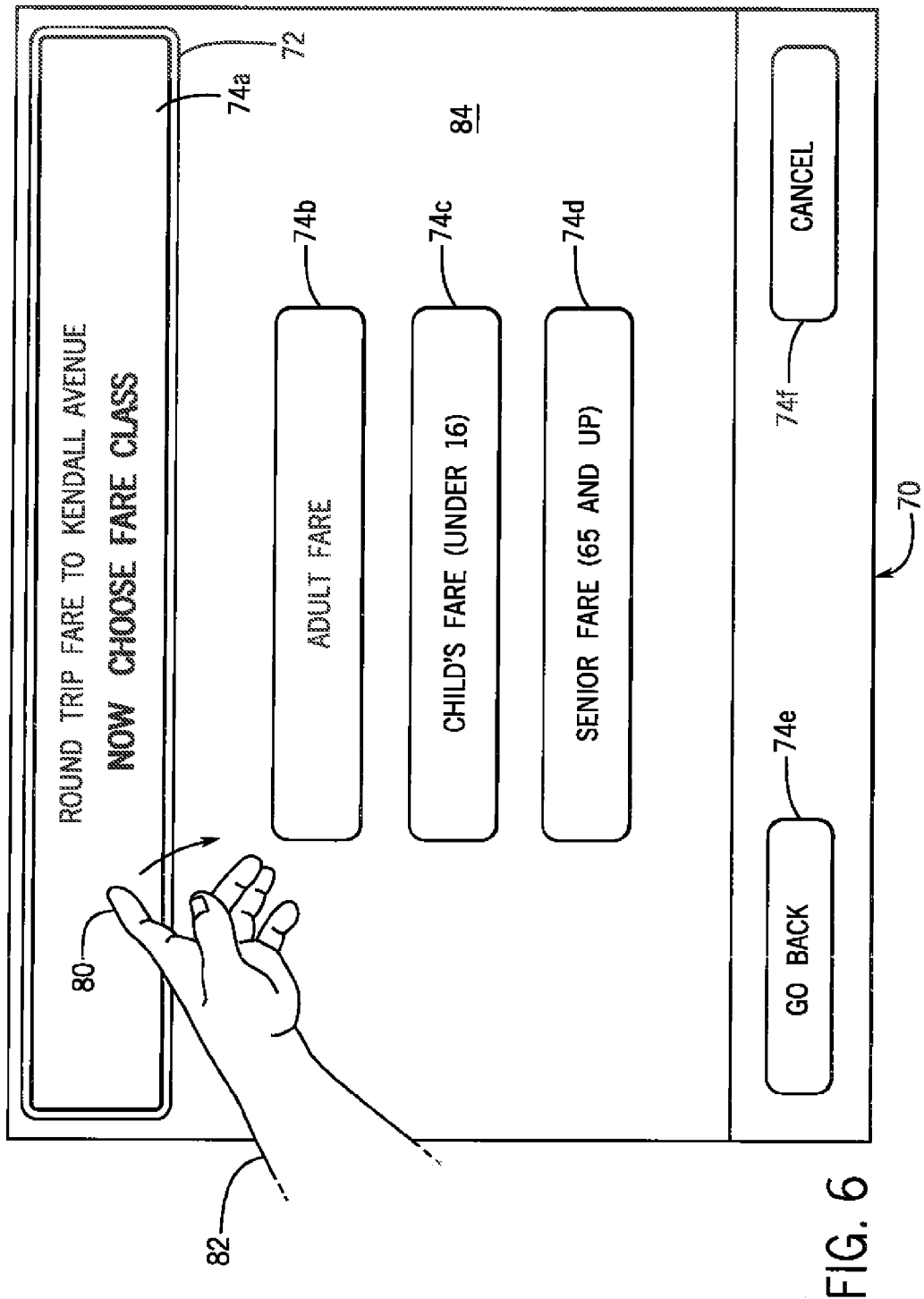
FIG. 6. is a front plan view of the exemplary screen of FIG. 5 in a second condition.
Figure 7:
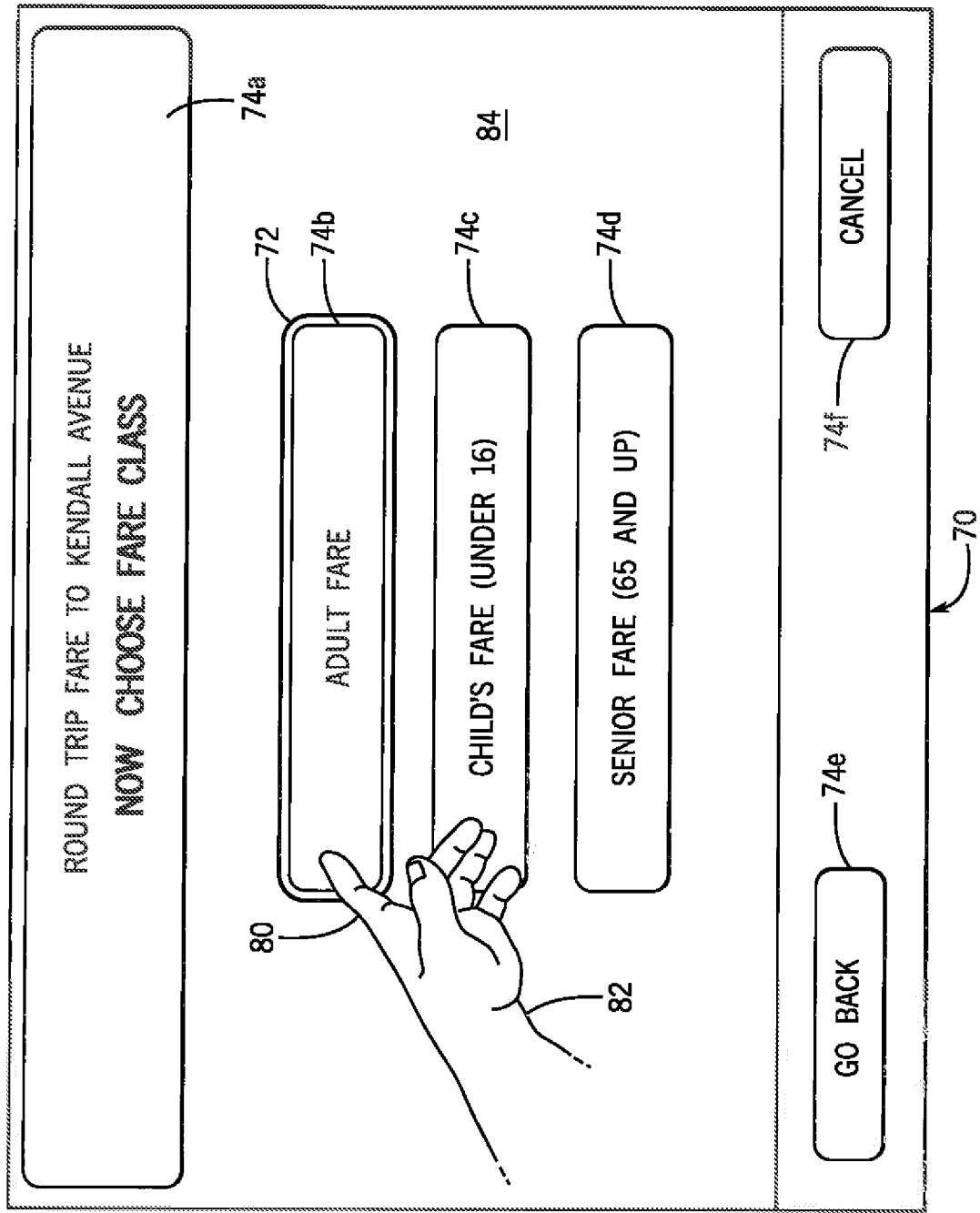
FIG. 7 is a front plan view of the exemplary screen of FIG. 5 in a third condition.

It can be appreciated that in certain circumstances, user 82 may encounter highlight 72 provided about one of the elements, e.g. element 74a, FIG. 5. This may occur if user 82 enters slide-to-read mode and subsequently removes finger 80 from element 74a, or if user 82 invokes access screen 70 by actuating action key 62 (or next or back keys, 38 and 48, respectively). In the event that highlight 72 is provided about one of the elements, e.g. element 74a, user 82 may enter the slide-to-read mode by touching at any location on the screen, including the highlighted element, e.g., element 74a, with finger 80, FIG. 6, and dragging their finger 80 across access screen 70 into contact with a second element, e.g., element 74b, FIG. 7. As a result, navigation highlight 72 moves from element 74a to element 74b and central processing unit 15 causes an audio reading of the information provided in element 74b over speaker 31. It can be appreciated that navigation highlight 72 may be removed from previously highlighted element 74a in response to disengagement of finger 80 with the element 74a or in response to engagement of finger 80 with the subsequently contacted element, namely, elements 74b-74f. In addition, central processing unit 15 may modify the visual appearance of the information provided in activation element 74b, (e.g., enlarge the text to facilitate the reading thereof) in response to engagement of element 74b with finger 80. User 82 may actuate the highlighted element, e.g., element 74b, by either depressing action key 62 with finger 80 or by tapping the highlighted element, e.g., element 74b. It is noted, however, that the simple removal of finger 80 from engagement with the highlighted element, e.g., element 74b, will not actuate the highlighted element. Further, it is noted independent of the location of navigation highlight 72, in the slide-to-read mode, a user 82 may selectively actuate any actionable element, e.g., elements 74b-74f, by tapping such element with finger 80.

If user 82 touches an element, e.g., element 74b, with finger 80 and drags finger 80 across access screen 70 out of and back into contact with the same element, e.g. element 74b, element 74b will be actuated upon the subsequent removal of finger 80 from such element. This functionality protects users with poor motor control from accidently triggering the slide-to-read function when user 82 is attempting to simply actuate a desired element, e.g., element 74b. However, if user 82 slides into contact with any other element, e.g., elements 74a or 74c-74f, after sliding finger 80 off element 74b, and then slides finger 80 back into contact with element 74b, element 74b will not be activated, but instead, navigation highlight 72 will be provided about element 74b and central processing unit 15 will cause an audio reading of the information provided in activation element 74b over speaker 31.

It is understood that user 82 may also navigate access screen 70 with up key 36 and/or down key 38. More specifically, up key 36 allows a user to move a navigation highlight 72 upwardly on a given screen, e.g. access screen 70, through elements 74a-74f to highlight a user-desired element 74a-74f. Down key 38 allows user 82 to move navigation highlight 72 downwardly on a given screen, e.g. access screen 70 through elements 74a-74f.

It can be appreciated that the software program stored on memory 25 may generate a series of screens. Each screen may include one or more elements 74a-74f, as heretofore described. In the present embodiment, it can be appreciated that actuation of element 74e or of back key 48 allows a user to scroll to the prior screen in the series. Similarly, actuation of next key 50 allows a user to scroll to a subsequent screen in the series. Further, it is noted that by incorporating access keys 24 into a conventional keyboard and utilizing the above-described behaviors, accessibility to kiosk 10 for individuals with disabilities is improved with added convenience to users without disabilities. The enhanced functionality of access keys 24 allows for easy navigation about access screen 70, and through the elements 74a-74f on such screen.

Various modes of carrying out the invention are contemplated as being within the scope of the following claims particularly pointing and distinctly claiming the subject matter that is regarded as the invention.

We claim:

1. A method for providing an individual increased accessibility to a touch screen displaying at least one element, the individual having a contact point, comprising the steps of:
   providing an input device spaced from and operatively connected to the touch screen, the input device having a key;
   engaging the touch screen with the contact point;
   dragging the contact point across the touch screen into engagement with a first element;
   highlighting the first element in response to engagement of the contact point with the first element; and
   maintaining the highlighting of the first element in response to disengagement of the contact point with the touch screen without activating the first element; and
   wherein:
   a selective tapping of the first element with the contact point activates the first element; and
   the actuating of the key of the input device activates the first element.

2. The method of claim 1 comprising the additional step of generating an audible announcement corresponding to the first element in response to engagement of the contact point with the first element.

3. The method of claim 1 wherein the first element is a virtual button.

4. The method of claim 1 comprising the additional steps:
   dragging the contact point across the touch screen from the first element into engagement with a second element;

removing the highlighting the first element in response to disengagement of the contact point with the first element as the contact point is dragged across the touch screen; and highlighting of the second element on the touch screen in response to engagement of the second element with the contact point.

5. The method of claim 4 comprising the additional step of generating a second audible announcement corresponding to the second element in response to engagement of the contact point with the second element.

6. The method of claim 1 comprising the additional steps:

dragging the contact point across the touch screen from the first element into engagement with a second element;

removing the highlighting the first element in response to engagement of the contact point with the second element; and highlighting of the second element on the touch screen in response to engagement of the second element with the contact point.

7. The method of claim 6 comprising the additional step of generating a second audible announcement corresponding to the second element in response to engagement of the contact point with the second element.

8. A method for providing an individual increased accessibility to a touch screen displaying first and second elements, the individual having a contact point, comprising the steps of:

providing an input device spaced from and operatively connected to the touch screen, the input device having a key;

initially engaging the touch screen with the contact point at a first location;

dragging the contact point across the touch screen into engagement with the first element;

highlighting the first element in response to engagement of the contact point with the first element;

maintaining the highlighting of the first element in response to disengagement of the contact point with the touch screen without activating the first element;

dragging the contact point across the touch screen from the first element into engagement with the second element;

highlighting the second element on the touch screen in response to engagement of the second element with the contact point;

maintaining the highlighting of the second element in response to disengagement of the contact point with the touch screen without activating the second element; and activating one of the highlighted first element and highlighted second element by selectively:

tapping one of the highlighted first element and highlighted second element with the contact point; and actuating the key of the input device.

9. The method of claim 8 wherein the first location is the second element.

10. The method of claim 8 wherein at least one of the first and second elements is a virtual button.

11. The method of claim 8 comprising the additional step of generating a first audible announcement corresponding to the first element in response to engagement of the contact point with the first element.

12. The method of claim 11 comprising the additional step of generating a second audible announcement corresponding to the second element in response to engagement of the contact point with the second element.

13. The method of claim 8 comprising the additional step of removing the highlighting from the first element in response to disengagement of the contact point with the first element as the contact point is dragged across the touch screen.

14. The method of claim 8 comprising the additional step of removing the highlighting from the first element in response to engagement of the contact point with the second element.

* * * * *